United States Patent
Niessner et al.

(10) Patent No.: US 10,138,364 B2
(45) Date of Patent: *Nov. 27, 2018

(54) THERMOPLASTIC MOLDING COMPOUNDS WITH OPTIMIZED FLOWABILITY-TOUGHNESS RATIO

(71) Applicant: INEOS Styrolution Group GmbH, Frankfurt (DE)

(72) Inventors: Norbert Niessner, Friedelsheim (DE); Philipp Boeckmann, Bad Duerkheim (DE); Roland Walker, Osnabrueck (DE); Marcus Reining, Ludwigshafen (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/114,615

(22) PCT Filed: Jan. 27, 2015

(86) PCT No.: PCT/EP2015/051548
§ 371 (c)(1),
(2) Date: Jul. 27, 2016

(87) PCT Pub. No.: WO2015/113948
PCT Pub. Date: Aug. 6, 2015

(65) Prior Publication Data
US 2016/0340504 A1 Nov. 24, 2016

(30) Foreign Application Priority Data
Jan. 28, 2014 (EP) .................................. 14152826

(51) Int. Cl.
C08L 25/12 (2006.01)
C08L 55/02 (2006.01)
C08J 3/00 (2006.01)
C08J 3/20 (2006.01)

(52) U.S. Cl.
CPC .............. C08L 25/12 (2013.01); C08J 3/005 (2013.01); C08J 3/203 (2013.01); C08J 2325/12 (2013.01); C08J 2409/00 (2013.01); C08J 2451/06 (2013.01); C08L 2205/025 (2013.01)

(58) Field of Classification Search
CPC ...... C08L 25/12; C08L 55/02; C08L 2325/12; C08L 2205/025
See application file for complete search history.

(56) References Cited

U.S. PATENT DOCUMENTS

| | | | |
|---|---|---|---|
| 4,068,064 A | 1/1978 | Platt et al. | |
| 5,362,783 A | 11/1994 | Eiffler et al. | |
| 6,596,811 B1 * | 7/2003 | Barghoorn | C08L 25/12 525/63 |
| 6,812,283 B2 | 11/2004 | Duijzings et al. | |
| 9,624,333 B2 * | 4/2017 | Niessner | C08F 2/26 |
| 2016/0075813 A1 * | 3/2016 | Niessner | C08F 2/26 525/78 |

FOREIGN PATENT DOCUMENTS

| | | |
|---|---|---|
| CA | 2233429 A1 | 10/1998 |
| CN | 1005633 B | 11/1989 |
| CN | 101970570 A | 2/2011 |
| DE | 2244519 A1 | 4/1973 |
| DE | 3843371 A1 | 7/1990 |
| DE | 4419897 A1 | 12/1994 |
| DE | 102005022632 A1 | 11/2006 |
| EP | 0022200 A1 | 1/1981 |
| EP | 0077038 A2 | 4/1983 |
| EP | 0363608 A1 | 4/1990 |
| EP | 0714941 A1 | 6/1996 |
| EP | 0869149 A2 | 10/1998 |
| EP | 1305345 B1 | 10/2004 |
| JP | H08169999 A | 7/1996 |
| WO | 00/24829 A1 | 5/2000 |
| WO | 2008/020012 A2 | 2/2008 |
| WO | 2012/065977 A1 | 5/2012 |
| WO | WO 2014/170406 * | 10/2014 |

OTHER PUBLICATIONS

McKee et al., Electronic translation of DE 102005022632, Nov. 2006.*
Schellenberg et al., Electronic tranlsation of DD 279891, Jun. 1990.*

* cited by examiner

Primary Examiner — Jeffrey C Mullis
(74) Attorney, Agent, or Firm — J.A. Lindeman & Co., PLLC

(57) ABSTRACT

The invention relates to a thermoplastic composition containing the components A and B and optionally the additional components C and D, the sum of which equals 100 wt. %. The molding compound consists of: a) 60 to 75 wt. % of one or more styrene copolymers A, b) 25 to 40 wt. % of one or more graft copolymers B, c) 0 to 15 wt. % of a rubber C which is different from component B, and d) 0 to 5 wt. % of one or more additives D. The composition contains 0.2 to 3.0 wt. %, based on the total weight of the components A to D, of oligomers, can be readily processed, and leads to scratch-resistant molded parts.

20 Claims, 2 Drawing Sheets

THERMOPLASTIC MOLDING COMPOUNDS WITH OPTIMIZED FLOWABILITY-TOUGHNESS RATIO

The present invention relates to thermoplastic molding materials/compositions having an improved melt index and comprising at least two different polymer components. The molding materials comprise the components one or more styrene copolymers A, at least one graft rubber B and optionally further additives D.

The present invention additionally relates to an improved method of producing these thermoplastic molding materials and to the use of the molding materials for producing molded articles, for example for household articles or electronic component parts.

Those skilled in the art have been familiar with the production of thermoplastic molding materials for decades. Of particular interest is the modification of styrene-acrylonitrile copolymers by incorporation of rubbers. This is achieved for example by graft copolymerization of styrene and acrylonitrile in the presence of a rubber and by subsequent blending of this graft copolymer with a separately produced polymeric matrix, for example a styrene-acrylonitrile copolymer or a methylstyrene-acrylonitrile copolymer.

The possibility that a thermal copolymerization of styrene and acrylonitrile may also form oligomers is described by K. Kirchner (Makromol. Chem. 1976, 177, 2031-2042). This document, via gas-liquid chromatography coupled with mass spectrometry, in the main uncovers the formation of dimers and moreover focuses on Diels-Alder adducts having three repeating units and the analysis thereof. Initiators such as di-tert-butylperoxide may be employed to counteract this formation of oligomers.

The effect of oligomers on the properties of styrene-acrylonitrile copolymers was investigated by Schellenberg and Hamann (Angew. Makromol. Chem. 1991, 187, 123-134). The impact of various oligomer amounts on product properties was also investigated in this connection. The oligomers are obtainable by polymerization of styrene and acrylonitrile and have two or three repeating units. This component has a residual monomer content of styrene of up to 8.4 wt % based on 100 wt % of oligomer. The investigations of Schellenberg revealed that an increased oligomer proportion essentially results in impaired product properties such as a decrease in Vicat softening temperature.

However, the melt volume index (MVR) steadily increases at an oligomer proportion of 0 to 5 wt %. This Schellenberg document does not elaborate on the effect of oligomers comprising more than three repeating units (of the monomers), and of oligomer mixtures thereof, on polymer compositions. There is likewise no indication of how an oligomer proportion might behave in a polymer blend.

EP-A 0 869 149 describes a polycarbonate/graft polymer blend, in particular of the ABS type, with reduced deposit formation. The blend comprises aromatic polycarbonates, thermoplastic homo-, co- and terpolymers, graft polymers and at least one additive. The reduced deposit formation and the mass loss increase with increasing oligomer amount. Oligomeric products are defined therein as products of two to four repeating units. The oligomer amount is preferably 0.6 wt % or less based on the ABS matrix.

U.S. Pat. No. 4,068,064 discloses reaction conditions for the production of vinyl copolymers which reduce the formation of the oligomer amount in bulk, solution or suspension polymerization. This document teaches inter alia that oligomers in the polymeric material are to be avoided. JP-A 8169999 likewise describes thermoplastic compositions comprising rubber-type graft polymers and a vinyl copolymer preferably comprising not more than 0.6 wt % of oligomers.

WO 2012/065977 describes a thermoplastic molding material based on styrene copolymers and polyamides comprising 0.1 to 5 wt % alkyl acrylate oligomers having a weight average of 1200 to 4000 g/mol. The oligomers are specially added and are not a constituent of the styrene-acrylate matrix. The reported comparative examples comprising no oligomers exhibit a lower melt flow index and a lower notched impact strength.

While the thermoplastic compositions described in the prior art seek to reduce the oligomer proportion to optimize product properties, additives must often be added to improve processing of the molding materials.

It is an object of the present invention to provide thermoplastic molding materials based on styrene copolymers and agglomerated graft rubber having an improved melt flow index (melt volume flow rate, MVR) and good notched impact strength (Charpy) for improved processing of the molding materials.

Surprisingly, the object may be achieved by providing a thermoplastic molding material comprising the components A and B and optionally the further components C and D which altogether sum to 100 wt %, wherein this molding material/composition comprises 0.2 to 3.0 wt %, based on the total weight of the components A to D, of oligomers.

The invention in particular provides a thermoplastic composition comprising the components A and B and optionally the further components C and D which altogether sum to 100 wt %, wherein the molding material is composed of:
a) 60 to 75 wt % of one or more styrene copolymers A,
b) 25 to 40 wt % of one or more graft copolymers B,
c) 0 to 15 wt % of a rubber C distinct from component B,
d) 0 to 5 wt % of one or more additives D, wherein this composition comprises 0.2 to 3.0 wt %, in particular 0.6 to 3.0 wt %, often 1.1 to 2.8 wt %, based on the total weight of the components A to D, of oligomers. These oligomers are generally formed in the production/processing of the components A and/or B. These oligomers are therefore present in the reported quantities of the styrene copolymer A and/or the graft copolymer B.

The invention in particular provides a thermoplastic composition comprising the components A and B and D which altogether sum to 100 wt %, wherein the molding material is composed of (about) 65 to 70 wt % of a styrene-acrylonitrile copolymer A, (about) 30 to 35 wt % of an ABS graft copolymer B and 0.1 to 5 wt % of an additive D, wherein the composition comprises (originating from the components A or B) 1.1 to 2.8 wt %, based on the total weight of the components A to D, of an oligomer composed of styrene and/or acrylonitrile having a molar mass of 100 to 700 g/mol.

The invention further provides a thermoplastic composition where the oligomers have a molar mass in the range from 100 to 700 g/mol.

The invention further provides a thermoplastic composition where the component B is a polybutadiene rubber preferably produced using 1 to 5 wt %, based on component B, of an agglomerating added substance.

The invention further provides a thermoplastic composition where oligomers are formed substantially from styrene and/or acrylonitrile. These oligomers are often formed from 2, 3, 4, 5 or 6 monomer units.

The invention further provides a thermoplastic composition where said composition comprises 60 to 70 wt % of one or more styrene copolymers A, wherein this styrene copolymer A is constructed from two or more monomers from the groups styrene, α-methylstyrene on the one hand and acrylonitrile and/or methyl methacrylate on the other hand. The styrene copolymer A is often an SAN copolymer.

The invention further provides a thermoplastic composition where said composition comprises 29 to 37 wt % of one or more graft copolymers B, wherein this graft copolymer B is constructed from a graft substrate and at least one graft superstrate, wherein the graft superstrate is constructed from two or more monomers from the group butadiene, styrene, acrylonitrile, α-methylstyrene, MMA, butyl acrylate, ethyl acrylate and methylacrylamide.

The invention further provides a thermoplastic composition where said composition additionally comprises 1 to 15 wt % of a rubber C distinct from component B, wherein said further rubber C comprises two or more monomers from the group ethene, propene, butene and/or octene as building blocks.

The invention further provides a thermoplastic composition where the graft copolymer B is constructed from:
(B1): 40 to 85 wt %, based on the solids content of the graft copolymer B, of a graft substrate B1 obtainable by (a) polymerization of:
(B11): 0 to 21 wt %, in particular 0 to 10 wt %, based on the graft substrate B1, of styrene, and
(B12): 79 to 100 wt %, in particular 90 to 100 wt %, based on the graft substrate B1, of butadiene;
and (b) agglomeration of the obtained graft substrate B1 by addition of:
(E): 0.01 to 5 parts by wt, based on 100 parts by wt of the graft substrate B1, in each case based on the solids content, of an agglomerating copolymer (E) composed of:
  (E1): 80 to 99.9 wt % of one or more $C_1$- to $C_{12}$-alkyl acrylates or $C_1$- to $C_{12}$-alkyl methacrylates and
  (E2): 0.1 to 20 wt % of one or more comonomers selected from the group consisting of acrylamide, methylacrylamide, ethylacrylamide and n-butylacrylamide; and
(B2): 15 to 60 wt %, based on the solids content of the graft copolymer B, of a graft shell (B2), obtainable by reaction of the agglomerated graft substrate B1 with a mixture of:
(B21): 70 to 90 wt %, based on the graft shell B2, of styrene, and
(B22): 10 to 30 wt %, based on the graft shell B2, of acrylonitrile,
wherein
  (i) the agglomerating copolymer (E) has a polydispersity U of less than 0.27 and a $d_{50}$ value of 100 to 150 nm and
  (ii) the agglomerated graft substrate B1 has a bimodal particle size distribution of a fraction x) of nonagglomerated particles having a $d_{50}$ value in the range from 80 to 120 nm and a fraction y) of agglomerated particles having a $d_{50}$ value in the range from 350 to 550 nm and a polydispersity U of less than 0.27.

The polydispersity U (ratio of Mw to Mn) and the particle size distribution may be determined by methods known to those skilled in the art (GPC, light scattering, NMR etc.).

The invention further provides a thermoplastic composition where the component A is constructed from 60 to 85 wt % of styrene and 15 to 40 wt % of acrylonitrile.

The invention also provides a method of producing a thermoplastic composition as described hereinabove by mixing the components A and B and optionally the further components C and/or D.

The present invention also provides a method of producing molding materials as are described hereinabove by mixing the components A and B and optionally the components C and D where the mixing is effected in one (or more) extruder(s) such that the composition after mixing comprises 0.2 to 3.0 wt %, in particular 0.6 to 3.0 wt %, often 1.1 to 2.8 wt %, based on the total weight of the components A to D, of oligomers. These oligomers generally originate from the components A and/or B.

The invention further provides a method of producing a thermoplastic composition as described hereinabove by the following steps:
  (i) polymerizing styrene, α-methylstyrene and/or acrylonitrile, wherein the thus obtained composition comprises 0.6 to 3.0 wt %, based on the total weight of the components A to D, of oligomers,
  (ii) polymerizing the monomers styrene and butadiene in aqueous emulsion to afford a particulate graft substrate B1,
  (iii) agglomeration of the particulate graft substrate B1 which is present in an emulsion using an agglomerating copolymer (E), wherein the copolymer (E) has a polydispersity U of less than 0.27 and a $d_{50}$ value of 100 to 150 nm to afford an agglomerated particulate graft substrate B1 and subsequently
  (iv) polymerizing the monomers styrene and acrylonitrile of the graft shell in aqueous emulsion in the presence of the agglomerated particulate graft substrate B1,
  (v) mixing the components A and B and optionally the further components C and/or D.

The invention further provides a method of producing a thermoplastic composition, wherein the mixing of the components is effected in an extruder and the extruding procedure is effected over a time period of 0.2 to 30 minutes, often 0.2 to 10 minutes, and in a temperature range from 230° C. to 260° C.

The invention further provides for the use of a thermoplastic composition as described hereinabove for producing fibers, films and molded articles. The invention also provides for the use of the abovedescribed molding materials for producing household articles, electronic component parts, domestic appliances, gardening tools, medical devices, motor vehicle component parts and bodywork parts.

The invention further provides molded articles (for example household articles, electronic component parts, domestic appliances, gardening tools, medical devices, motor vehicle component parts and bodywork parts), fibers and films, produced from a molding material as described hereinabove.

The components of the composition are more particularly described hereinbelow.

Component A

As component A the thermoplastic compositions/molding materials comprise 60 to 75 wt % (based on the sum of all components) of at least one styrene copolymer A. Component A is known to those skilled in the art and may be produced by commonly used methods, for example free-radical anionic or cationic polymerization.

Component A is preferably produced by means of continuous or discontinuous bulk polymerization, emulsion polymerization or solution polymerization. It is particularly preferable when the polymerization is carried out in the 0 to 20 wt %, often 0.5 to 20 wt %, of aromatic solvents, such as toluene, xylene or ethylbenzene. Details concerning the production of component A may also be found in Kunststoff-Handbuch (Vieweg-Daumiller, volume V polystyrene, Carl-Hanser-Verlag, Munich, 1969, page 124, lines 12 ff.).

The term styrene copolymers is to be understood as meaning in particular SAN or other, rubber-free styrene copolymers. Examples of the component A are commonly used copolymer matrices, for example styrene-acrylonitrile copolymers (SAN) produced by bulk polymerization, emulsion polymerization or solvent polymerization. Mixtures of matrices are also suitable, for example those described in Ulmann's Encyclopedia of Industrial Chemistry (VCH-Verlag, 5th edition, 1992, p. 633 f.)

In a further embodiment of the invention a molding material comprising one or more styrene copolymers A is produced, wherein this styrene copolymer A is constructed from two or three monomers from the group styrene, acrylonitrile and/or α-methylstyrene. The copolymer matrix A is preferably produced from the components acrylonitrile and styrene and/or α-methylstyrene by bulk polymerization or in the presence of one or more solvents.

Preference is given to copolymers A having molar masses $M_w$ of 15 000 to 300 000 g/mol, wherein the molar masses may be determined for example by light scattering in tetrahydrofuran (GPC with UV detection).

It is particularly preferable when component A comprises acrylonitrile as the α,β-unsaturated component and styrene and/or α-methylstyrene as the aromatic vinylic component. The component A comprises a certain amount of oligomers as described hereinabove.

Component A is often present in the molding material with 60 to 70 wt % of one or more styrene copolymers A, wherein this styrene copolymer A is preferably constructed from two or more monomers from the group styrene, acrylonitrile, α-methylstyrene and methyl methacrylate. It is very particularly preferable when component A of the molding material of the invention comprises an SAN or an AMSAN copolymer or a styrene-α-methylstyrene-acrylonitrile copolymer (SAMSAN), composed of acrylonitrile and α-methylstyrene and styrene.

The copolymer matrix A may for example comprise:
(Aa) polystyrene-acrylonitrile produced from, based on (Aa), 60 to 85 wt % of styrene and 15 to 40 wt % of acrylonitrile, or
(Ab) poly-α-methylstyrene-acrylonitrile produced from, based on (Ab), 60 to 85 wt of α-methylstyrene and 15 to 40 wt % of acrylonitrile, or
(Ac) a mixture of the copolymer matrix (Aa) and the copolymer matrix (Ab).

The copolymer matrix A may also be obtained by copolymerization of acrylonitrile, styrene and α-methylstyrene.

The number-average molecular weight ($M_n$) of the copolymer matrix A may be effected by commonly used methods, for example gas chromatography or by gel permeation chromatography and is preferably 15 000 to 500 000 g/mol, preferably 15 000 to 300 000 g/mol (determined by means of GPC with UV detection). The viscosity (VZ) of the copolymeric matrix A (determined according to DIN 53726 at 25° C. in a 0.5 wt % solution in DMF) is for example from 50 to 120 ml/g. The copolymer matrix A may be produced by bulk polymerization, emulsion polymerization or solution polymerization in for example toluene or ethylbenzene according to a method such as is described for example in Kunststoff-Handbuch, Vieweg-Daumiller, volume V, (polystyrene), Carl-Hanser-Verlag, Munich 1969, pages 122 f., lines 12 ff.

Component B

In one embodiment of the invention a composition/molding material comprising 25 to 40 Wt %, often 29 to 37 wt %, of one or more graft polymers B is produced. This graft polymer B is preferably constructed from a graft substrate and at least one graft superstrate.

The graft polymer B is for example constructed from two or more monomers from the group butadiene, isoprene, styrene, acrylonitrile, α-methylstyrene, methyl methacrylate, ethyl acrylate and/or methylacrylamide. Reference is made to the description in Ullmann's Encyclopedia of Industrial Chemistry (5th edition, VCH, 1992, pages 633 f.) for elucidation of the graft polymer B.

As component B the thermoplastic molding materials often comprise a graft rubber, wherein this graft rubber preferably accounts for 25 to 40 wt %, in particular 29 to 37 wt %, of the total molding materials. This graft polymer B is constructed from a graft substrate, composed of for example polybutadiene (optionally a copolymer comprising butadiene as the main component), and at least one graft superstrate. The graft superstrate is preferably constructed from two or more monomers from the group styrene, acrylonitrile, α-methylstyrene, ethyl acrylate, methylacrylamide and/or other copolymerizable monomers.

The production of these graft rubbers B is disclosed in DE-A 38 43 371 or DE-22 44 519. EP-A 0 022 200 discloses producing thermoplastic molding compounds comprising a copolymer matrix composed of styrene and acrylonitrile and a graft copolymer composed of a rubber latex, styrene and acrylonitrile. This comprises initially producing a polybutadiene latex by radical polymerization using potassium peroxodisulfate as initiator. This rubber latex is then subjected to an agglomeration which serves to increase the size of the rubber particles. This agglomeration may, for example, be effected by reaction of the rubber latex with an emulsion of a copolymer of ethyl acrylate and methacrylamide. The graft rubber is then produced by reaction of the agglomerated rubber latex with styrene and acrylonitrile using an initiator. This document does not elaborate on the oligomer proportion.

In a further embodiment of the invention a molding material is employed which comprises as component B a graft rubber, wherein the agglomerated graft substrate B1 has a bimodal particle size distribution of a fraction x) of nonagglomerated particles having a $d_{50}$ value in the range from 80 to 120 nm and a fraction y) of agglomerated particles having a $d_{50}$ value in the range from 350 to 550 nm and a polydispersity U of less than 0.27. It is further known to those skilled in the art how to determine these distributions and that the size of the rubber particles has a substantial impact on the physical properties of the thermoplastic molding materials.

For production convenience it may be advantageous to initially produce a rubber latex having a small particle size of the rubber particles and to increase the particle size of the rubber particles by an agglomeration method in a subsequent step. EP-A 077 038 describes for example the agglomeration of a dispersed rubber in the presence of a dispersion of an acid-group-comprising latex and in the presence of a neutral electrolyte.

EP-A 714 941 discloses a method of mechanical agglomeration of rubber particles which, however, can be implemented on an industrial scale only at great expense and inconvenience. Further methods for producing particulate rubbers comprising at least one fraction of agglomerated particles are disclosed in EP-A 0 022 200, DE 10 2005 022 632, EP-A 1 305 345, WO 2008/020012.

In a further embodiment of the invention a molding material is employed which comprises as component B a graft rubber composed of a graft substrate (B1) and a graft superstrate (B2) constructed from:

B1: 40 to 85 wt %, based on the solids content of the graft copolymer B, of a graft substrate (B1) obtainable by:
(a) polymerization of:
(B11): 0 to 21 wt %, in particular 0 to 10 wt %, based on the graft substrate B1, of at least one vinylaromatic, in particular styrene, and
(B12): 79 to 100 wt %, in particular 90 to 100 wt %, based on the graft substrate B1, of at least one diene, in particular butadiene,
(wherein (B11) and (B12) sum to 100 wt %) and
(b) agglomeration of the obtained graft substrate B1 by addition of:
(E): 0.01 to 5 parts by wt, based on 100 parts by wt of the graft substrate B1, in each case based on the solids content, of an agglomerating copolymer (E) composed of:
(E1): 80 to 99.9 wt % of one or more hydrophobic $C_1$- to $C_{12}$-alkyl acrylates or $C_1$- to $C_{12}$-alkyl methacrylates and
(E2): 0.1 to 20 wt % of one or more hydrophilic comonomers selected from the group consisting of acrylamide, methylacrylamide, ethylacrylamide and n-butylacrylamide,
(wherein (E1) and (E2) sum to 100 wt %); and
B2: 15 to 60 wt %, based on the solids content of the graft copolymer B, of a graft shell obtainable by reaction of the agglomerated graft substrate B1 with a mixture of:
(B21) 70 to 90 wt %, based on the graft shell (B2), of styrene and/or α-methylstyrene, in particular styrene, and
(B22) 10 to 30 wt %, based on the graft shell (B2), of acrylonitrile and/or methyl methacrylate, in particular acrylonitrile,
(wherein the graft substrate B1 and the graft shell B2 sum to 100 wt % in total), wherein:
(i) the agglomerating copolymer (C) has a polydispersity U of less than 0.27 and a $d_{50}$ value of 100 to 150 nm and
(ii) the agglomerated graft substrate B1 has a bimodal particle size distribution of a fraction x) of nonagglomerated particles having a $d_{50}$ value in the range from 80 to 120 nm and a fraction y) of agglomerated particles having a $d_{50}$ value in the range from 350 to 550 nm and a polydispersity U of less than 0.27.

It is preferable to employ an agglomerated graft rubber, the graft substrate (B1) being premixed with an agglomerating component (E).

The graft substrate (B1) may be composed of a diene component (B11) such as for example isoprene and/or butadiene, butadiene being preferred, and a component (B12) comprising styrene, acrylonitrile and/or α-methylstyrene, styrene being preferred. Generally, for the graft substrate B1 the diene component (B12) is employed in an amount of 79 to 100, often 90 to 100, wt %, preferably of 90 to 98 wt %, and the vinylaromatic component (B11) is employed in an amount of 0 to 21 wt %, often 0 to 10 wt %, preferably of 2 to 10 wt %.

Preference is given to a graft substrate B1 composed of butadiene and styrene, said substrate is employed in the abovementioned composition. In one embodiment the styrene content is 7 to 14 wt %, in particular 7 to 10 wt %, based on B1.

To produce the graft substrate (B1) the components (B12) and optionally (B11) are polymerized in aqueous emulsion according to methods known to those skilled in the art at temperatures of generally 20° C. to 100° C., preferably 50° C. to 90° C. Customary assistants may be employed here, such as alkali metal salts of alkyl- or aryl-sulfonic acids, alkyl sulfates, fatty alcohol sulfonates, salts of higher fatty acids having 10 to 30 carbon atoms or resin soaps.

Further assistants that may be employed include polymerization initiators, in particular the commonly used persulfates such as potassium peroxodisulfate, though redox systems are also suitable. The amounts of initiators, for example 0.1 to 1 wt % based on the total weight of the monomers used for producing the graft substrate (B1), depends on the desired molar weight. Generally, a water/monomer ratio from 2:1 to 0.7:1 is employed.

Polymerization assistants may be the customary buffer substances by means of which the pH is adjusted to the preferred range of 6 to 10, such as sodium bicarbonate and sodium pyrophosphate, and also generally 0.1 to 3 wt % of a molecular weight regulator such as mercaptans, terpinol or dimeric α-methylstyrene.

The graft substrate (B1) is employed with an agglomerating component (E) which according to the invention has a polydispersity U of less than 0.27 and a $d_{50}$ value of 100 to 150 nm. The component (E) is constructed from a copolymer (E1) composed of one or more hydrophobic $C_1$- to $C_{12}$-alkyl acrylates or $C_1$- to $C_{12}$-alkyl methacrylates and (E2) composed of one or more hydrophilic comonomers selected from the group consisting of acrylamide, methylacrylamide, ethylacrylamide and n-butylacrylamide.

For the component E the copolymer (E1) is employed in an amount of 80 to 99.9 wt %, preferably 90 to 99.9 wt %, and the comonomers component (E2) is employed in an amount of 0.1 to 20 wt %, preferably 0.1 to 10 wt %.

It is preferable to use $C_1$-$C_4$-alkyl acrylates or mixtures thereof for the monomer (E1). It is particularly preferable when ethyl acrylate is used as monomer (E1) and methacrylamide is used as monomer (E2). In a particularly preferred embodiment copolymer (E) is constructed from 92 to 98 wt % of ethyl acrylate and 2 to 8 wt %, in each case based on the total solids in (E), of methylacrylamide.

Particular preference is given to a hereinabove-described copolymer (E) having a core constructed from at least one of the hydrophobic monomers recited as component (C1), preferably from ethyl acrylate, wherein this core is grafted with a copolymer constructed from the components (E1) and (E2).

The production of the agglomerating copolymer E employed is known to those skilled in the art, preferably by emulsion polymerization, and the emulsifiers recited hereinabove for the graft substrate B1 may be employed. It is preferable when the sodium and potassium salts of alkylsulfonates having 10 to 18 carbon atoms are employed and in an amount of 0.5 to 5 wt %, preferably 0.5 to 2 wt %, based on the total monomer content of the copolymer (C).

According to the invention the method of producing the hereinabove-described core-shell copolymers (E) is carried out via an emulsion polymerization comprising the steps of;
(x) emulsion polymerization of at least one monomer (E1) as defined hereinabove in a first step and
(y) addition of a monomer mixture comprising monomers (E1+E2) in a further step, wherein in step (y) the mixture in an amount of 0.45 to 4.50 wt % based on the total monomer content.

The agglomerating copolymer (E) preferably has a polydispersity U of less than 0.26, particularly preferably of less than 0.25.

The agglomerating copolymer (E) preferably has a $d_{50}$ value of 110 to 140 nm, particularly preferably of 115 to 140 nm.

The agglomeration of the graft substrate (B1) is generally effected by addition of a dispersion of the hereinabove-described copolymer (E). The concentration of the copolymer (E) in the dispersion used for agglomeration shall generally be between 3 to 60 wt %, preferably between 5 to 40 wt %.

The temperature of the agglomeration is generally kept in the range from 20° C. to 120° C., preferably from 30° C. to 100° C., and the addition of the agglomerating copolymer (E) may be effected all at once or portionwise, continuously or with a feed profile over a certain time period. The agglomeration time, i.e. the time from commencement of the addition of E to the start of the subsequent graft copolymerization, is preferably from one minute up to two or more hours, for example up to 2 hours.

Electrolytes may optionally be added to the agglomeration in an amount of 1 to 50 wt % based on 100 wt % of the solids content of the copolymer E. Contemplated here as basic electrolytes are organic, preferably inorganic, hydroxides. Lithium hydroxide, sodium hydroxide or potassium hydroxide in particular may be employed, for example in concentration ranges of 0.001 to 0.1 g of electrolyte/ml.

The agglomerated graft substrate B1 obtained after the agglomeration has a bimodal particle size distribution of fractions x) and y). Here, x) stands for a fraction of nonagglomerated particles generally having a $d_{50}$ value in the range from 80 to 120 nm and y) stands for a fraction of agglomerated particles having a $d_{50}$ value in the range from 350 to 550 nm and a polydispersity U of less than 0.28.

To produce the graft copolymers B the agglomerated graft substrate B1 is grafted with the monomers B21 and B22 of the graft shell (B2), the graft polymer generally being constructed from 40 to 85 wt % of a graft substrate (B1) and 15 to 60 wt %, in each case based on the solids content of the graft copolymer B, of a graft shell, where B1 and B2 together sum to 100 wt %.

The graft shell (B2) may be obtained for example by reaction of (B21) 70 to 90 wt % of styrene and/or α-methylstyrene, in particular styrene, and (B22) 10 to 30 wt % of acrylonitrile, methacrylonitrile and/or methyl methacrylate, in particular acrylonitrile, in the presence of the agglomerated graft substrate (B1). B21 and B22 sum to 100 wt %.

The graft shell (B2) is preferably prepared by an emulsion polymerization process after performance of the hereinabove-described agglomeration of the graft substrate (B1).

The graft copolymers B according to the invention may be further used as they are obtained in the reaction mixture, for example as a latex emulsion or latex dispersion. Alternatively, however, they may also be worked up in a further step. Workup measures are known in principle to those skilled in the art. Examples of workup steps include the isolation of the graft copolymers B from the reaction mixture, for example by spray drying, shearing or by precipitation with strong acids or using other precipitants, for example inorganic compounds such as magnesium sulfate. A further example of a workup step is drying of the isolated rubber. The solids content of the dispersion of the graft rubber is often about 40 wt %.

The graft copolymers B may be produced by:
(i) polymerizing the monomers B11 and B12 in aqueous emulsion to afford a particulate graft substrate B1,
(ii) agglomeration of the particulate graft substrate B1 which is present in an emulsion using an agglomerating copolymer (E), wherein the copolymer (E) has a polydispersity U of less than 0.27 and a $d_{50}$ value of 100 to 150 nm to afford an agglomerated particulate graft substrate B1, and subsequently
(iii) polymerizing the monomers B21 and B22 of the graft shell in aqueous emulsion in the presence of the agglomerated particulate graft substrate B1,
wherein B, B11, B12, B1, E, B21 and B22 are as defined for the graft copolymer according to the invention.

Component C:

In a further embodiment of the invention the molding material comprises one or more additional components C and/or D.

The molding material may for example additionally comprise 0 to 15 wt %, often 0.1 to 15 Wt %, in particular 1 to 15 wt %, of further rubbers C or a mixture of rubbers distinct from component B. This further rubber C may for example be constructed from two or more monomers, preferably from the group butadiene, isoprene, styrene, acrylonitrile, α-methylstyrene, methyl methacrylate, butyl acrylate and/or ethyl hexylacrylate. Functionalized rubbers for example based on ethene and $C_3$-$C_8$-olefins are also usable as component C.

Suitable in particular are rubbers having a core-shell construction. These are graft rubbers produced in emulsion composed of at least a "hard" and a "soft" constituent, wherein the ratio of hard phase to soft phase is often between 20 to 60 and 70 to 30 parts by weight. Preference is given to employing graft rubbers having as the core (graft substrate) a component having a glass transition temperature Tg of less than −20° C., preferably less than −40° C. The rubber core may preferably be composed of diene (particularly preferably butadiene), acrylates (preferably n-butyl acrylate, ethylhexyl acrylate), EPDM rubber or siloxane. The proportion of the rubber core is between 40 and 90 wt %. The glass transition temperature of the core, determined by methods known to those skilled in the art, is preferably below 0° C.

The particle size of this rubber shall be 0.05 to 10 μm, preferably 0.1 to 5 μm and in particular 0.15 to 3 μm. Reactive groups (epoxy/oxazoline groups, acid, acid anhydride, ester) too may be present in the outer shell.

Mention may moreover also be made of copolymers of α-olefins as rubber component C. The α-olefins are typically monomers having 2 to 8 carbon atoms, preferably ethylene and propylene.

Comonomers that have proven suitable include alkyl acrylates or alkyl methacrylates deriving from alcohols having 1 to 8 carbon atoms, preferably from ethanol, butanol or ethylhexanol, and also reactive comonomers such as acrylic acid, methacrylic acid, maleic acid, maleic anhydride or glycidyl (meth)acrylate and also vinyl esters, in particular vinyl acetate. Mixtures of various comonomers can likewise be employed. Copolymers of ethylene with ethyl or butyl acrylate and acrylic acid and/or maleic anhydride have proven particularly suitable. These copolymers may be produced in a high-pressure process at a pressure of 400 to 4500 bar or by grafting of the comonomers onto the poly-α-olefin. The proportion of the α-olefin which is attributable to the copolymer C is generally in the range from 55 to 99.95 wt %.

Component D

As further component D the thermoplastic compositions optionally comprise 0 to 5 wt %, often 0.1 to 5 wt %, of one or more additives (assistants and added substances) distinct from the components A to C. Mention may be made of monofunctional anhydrides, particulate mineral fillers, processing aids, stabilizers and oxidation retardants, agents against thermal decomposition and decomposition by ultraviolet light, lubricating and demolding agents, flame retardants, dyes and pigments and plasticizers.

The term monofunctional anhydrides is to be understood as meaning low molecular weight compounds having dicarboxylic anhydride groups. It is also possible to use two or more of these compounds in accordance with the present invention. The compounds are generally present with a molar weight of less than 3000 g/mol, preferably less than 150 g/mol. These compounds may also comprise further functional groups in addition to the dicarboxylic anhydride groups.

Suitable monofunctional anhydrides are $C_4$-$C_{10}$-alkyl dicarboxylic anhydrides, for example succinic anhydride, glutaric anhydride or adipic anhydride. Also contemplated are cycloaliphatic dicarboxylic anhydrides such as 1,2-cyclohexadicarboxylic anhydride and dicarboxylic anhydrides which are ethylenically unsaturated or aromatic compounds, for example maleic anhydride, phthalic anhydride or trimellitic anhydride. Phthalic anhydride is preferentially suitable.

Particulate mineral fillers may be provided for example by amorphous silica, carbonates such as magnesium carbonate, calcium carbonate (chalk), powdered quartz, mica, various silicates such as clays, muscovite, biotite, suzoite, tin maletite, talc, chlorite, phlogophite, feldspar, calcium silicates, such as wollastonite or kaolin, in particular calcined kaolin. These are often employed in very finely divided form.

The particle diameter of the particles may be determined for example by acquiring electron micrographs of thin films of the polymer mixture and evaluating at least 25, preferably at least 50, filler particles. Determination of particle diameter may likewise be effected via sedimentation analysis (as per Transactions of ASAE, page 491, 1983). The weight fraction of the fillers which is less than 40 μm may also be measured by means of sieve analysis. The aspect ratio is the ratio of particle diameter to thickness (largest dimension to smallest dimension).

Also employable are fibrous fillers such as carbon fibers, potassium titanate whiskers, aramid fibers or preferably glass fibers, at least 50 wt % of the fibrous fillers (glass fibers) having a length of more than 50 mm. The employed (glass) fibers may preferably have a diameter of up to 25 μm, particularly preferably 5 to 13 μm. It is preferable when at least 70% of the glass fibers have a length of more than 60 μm. It is particularly preferable when the average length of the glass fibers in the finished molding is 0.08 to 0.5 mm. The length of the glass fibers is based on a finished molding obtained for example after injection molding. The glass fibers may be added to the molding materials in ready cut-to-length form or else in the form of rovings.

UV stabilizers are for example various substituted resorcinols, salicylates, benzotriazoles and benzophenones which may generally be employed in amounts of up to 2 wt %, for example 0.1 to 2 wt %.

It is further possible to add oxidation retardants and thermal stabilizers to the thermoplastic compositions according to the invention.

Mention may be made of halides of metals from group I of the periodic table, for example sodium and lithium halides, optionally in conjunction with copper(I) halides, for example chlorides, bromides and iodides. The halides, in particular of copper, may further comprise electron-rich π-ligands. As an example of such copper complexes mention may be made of Cu halide complexes with for example triphenylphosphine. Zinc fluoride and zinc chloride may also be used.

Also employable are sterically hindered phenols, hydroquinones, substituted representatives of this group, secondary aromatic amines, optionally in conjunction with phosphorus-containing acids/the salts thereof, and mixtures of these compounds, preferably in concentrations of up to 1 wt %, for example 0.1 to 1 wt %, based on the weight of the total mixture.

The use of UV stabilizers and thermal stabilizers is especially advantageous for styrene copolymers. Examples of suitable stabilizers may additionally be found in DE-A 44 19 897. Transesterification inhibitors, such as phosphates, phosphites or phosphonites, may also be present.

Lubricating and demolding agents which are generally added to the thermoplastic material in amounts of up to 1 wt %, for example 0.1 to 1 wt %, are stearic acid, stearyl alcohol, alkyl stearates and N-alkylstearamides, preferably Irganox®, and also esters of pentaerythritol with long-chain fatty acids. It is also possible to employ salts of calcium, of zinc or of aluminum of a stearic acid and also dialkyl ketones, for example distearyl ketone.

It is moreover also possible to use ethylene oxide-propylene oxide copolymers as lubricating and demolding agents.

Flame retardants may be either halogen-containing or preferably halogen-free compounds. Suitable halogen compounds, with brominated compounds being preferable to chlorinated compounds, remain stable during production and processing of the molding material according to the invention so that there is no release of corrosive gases and efficacy is thus not impaired. Preference is given to using halogen-free compounds, for example phosphorus compounds, in particular phosphine oxides and derivatives of acids of phosphorus and salts of acids and acid derivatives of phosphorus.

It is particularly preferable when phosphorus compounds comprise ester, alkyl, cycloalkyl and/or aryl groups. Likewise suitable are oligomeric phosphorus compounds having a molecular weight of less than 2000 g/mol as are described for example in EP-A 0 363 608.

Pigments and dyes may likewise be present and are generally present in amounts of 0 to 4, preferably 0 to 3.4 and in particular 0.5 to 3 wt %. Pigments for coloring thermoplastics are generally known, see for example R. Gächter and H. Müller, Taschenbuch der Kunststoffadditive, Carl Hanser Verlag, 1983, p. 494 to 510. The first preferred group of pigments that may be mentioned are white pigments such as zinc oxide, zinc sulfide, white lead (2 $PbCO_3 \cdot Pb(OH)_2$), lithopone, antimony white and titanium dioxide. Of the two most commonly used crystal modifications (rutile and anatase) of titanium dioxide it is in particular the rutile form that is used for imparting white color to the molding materials according to the invention. Black color pigments which may be employed in accordance with the invention are iron oxide black ($Fe_3O_4$), spinel black ($Cu(Cr, Fe)_2O_4$), manganese black (mixture of manganese dioxide, silicon oxide and iron oxide), cobalt black and antimony black and also, particularly preferably, carbon black, which is usually employed in the form of furnace or gas black (see G. Benzing, Pigmente für Anstrichmittel, Expert-Verlag (1988), p. 78 ff). It will be appreciated that inorganic color pigments such as chromium oxide green or organic color pigments such as azo pigments and phthalocyanines may be employed in accordance with the invention to obtain certain hues. Such pigments are generally commercially available. It can further be of advantage to use the abovementioned pigments or dyes in a mixture, for example carbon black with copper phthalocyanines, since this generally facilitates the dispersion of color in the thermoplastic.

In the context of the present invention the term of oligomers is to be understood as meaning compounds having a molar mass ($M_w$) of 100 to 700 g per mole. Determination of molar mass may be effected by commonly used methods (such as size exclusion chromatography, SEC). The oligomers are often formed substantially from the monomers styrene and/or acrylonitrile. These oligomers often originate from the component A of the composition.

The production of the thermoplastic molding materials according to the invention is effected according to known methods by mixing of the components. It may be advantageous to premix individual components. Mixing of the components in solution with removal of the solvents is also possible. Suitable organic solvents are for example chlorobenzene, mixtures of chlorobenzene and methylene chloride or mixtures of chlorobenzene and aromatic hydrocarbons such as toluene.

Chlorine-containing solvents are preferably avoided. Evaporation of the solvent mixtures may for example be effected in evaporating extruders.

The mixing of the, for example dry, components A and B and optionally C and D may be effected by any known method. It is preferable when the mixing is carried out at temperatures of 200° C. to 290° C., in particular 230° C. to 260° C., by conjoint extruding, kneading or rolling of the components, the components optionally having been isolated beforehand from the as-polymerized solution or from the aqueous dispersion.

The thermoplastic molding materials according to the invention may be processed by the known methods of thermoplastics processing, for example by extrusion, injection molding, calendering, blow molding or sintering.

The molding materials according to the invention may be used for producing films, fibers and molded articles. In addition, said molding materials may preferably be employed for producing bodywork parts in the automotive sector, in particular for producing mechanically demanding automotive parts and the component parts recited at the outset.

The invention also provides corresponding molded articles, fibers or films and also bodywork parts of motor vehicles and the products described at the outset.

The molding materials according to the invention may be produced by methods known per se, for example extrusion. Production may be effected by mixing and subsequently extruding the starting components in conventional mixing apparatuses such as screw extruders, preferably twin-screw extruders, Brabender mixers or Banbury mixers and kneaders. The extrudate is cooled and comminuted after extrusion. The sequence in which the components are mixed may be varied and thus two or optionally three components may be premixed or else all components may be mixed conjointly.

To produce the molding materials the hereinabove-described particulate graft polymers are incorporated into a hard component, for example the SAN copolymer. Incorporation may for example be effected by isolating the particulate graft polymer(s) from the emulsion by addition of an electrolyte. Isolation (of the soft component) may for example be effected inter alia by precipitation, centrifugation, evaporation or other commonly used methods.

The intermediate product may then optionally be dried in order to be mixed with the hard component A by conjoint extruding, kneading or rolling.

Intensive commixing is advantageous to achieve the most homogeneous commixing of the components possible. This generally requires average mixing times of 0.2 to 30 minutes, preferably of 5 to 30 minutes, at temperatures of 200° C. to 290° C., preferably of 230° C. to 260° C. The extrudate is generally cooled and comminuted after extrusion.

The molding materials according to the invention surprisingly exhibit well-balanced product properties in terms of melt flow index (MVR), haze, scratch resistance and notched impact strength (aK) when a defined amount of oligomers is present in the composition.

Figure 1:
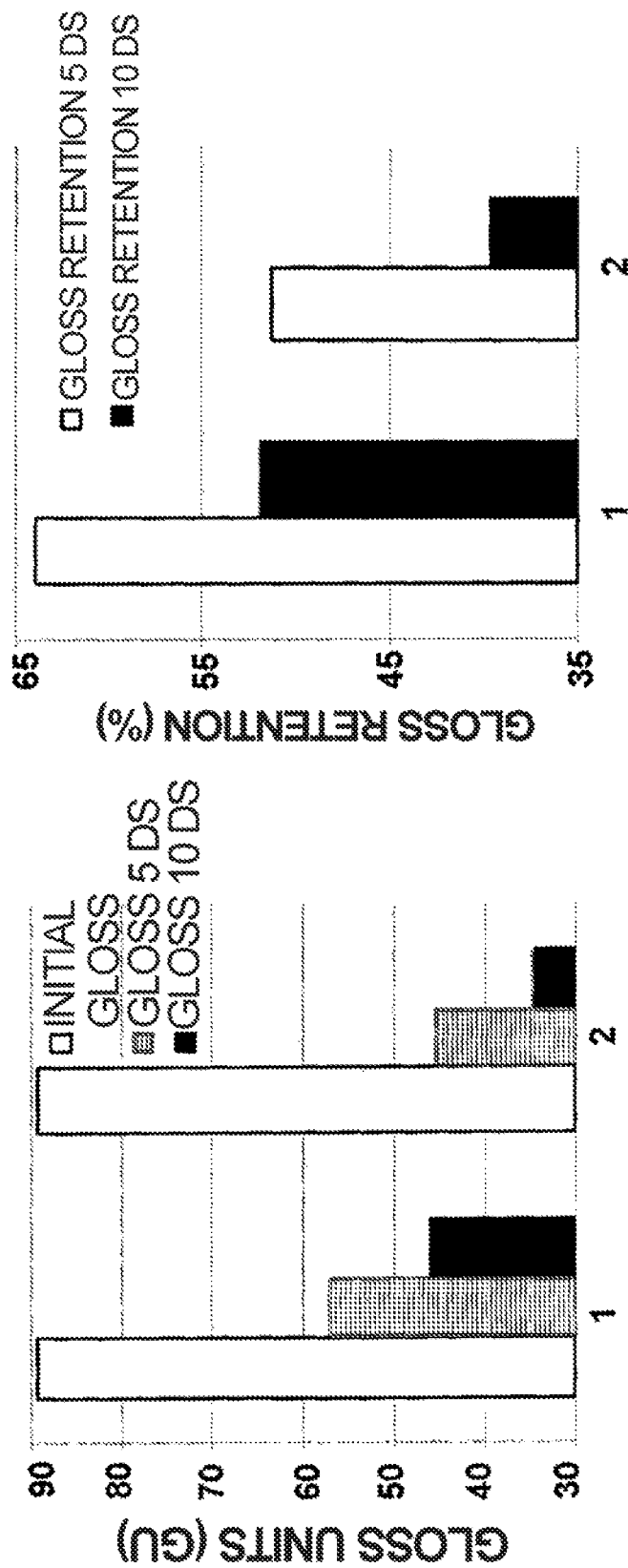
FIG. 1 reports the result of a Crockmeter test with gloss units (GU) before (0 double strokes, DS) and after scratching (5 and 10 double strokes), shown on the left, and gloss retention (%) after scratching (5 and 10 double strokes), shown on the right.

The invention is elucidated via the examples and claims which follow:

Polymer Properties and Methods of Measurement

The SAN oligomer proportion was determined by SEC measurement.

The notched impact strength (ak) of the thermoplastic molding materials at 23° C. was determined on ISO bars as per DIN 53 453 (ISO 179 1eA).

To determine scratch resistance a Crockmeter test and a nanoindentation test were carried out. Scratch resistance was carried out by means of a nanoindentation test as per PV 3952 with scratch depths in the mm range. To this end, after undergoing scratching stress, the surface of the component part was subjected to colorimetric measurement and visual evaluation.

Rub fastness was tested by means of a Crockmeter test as per DIN EN ISO 105-X12. 5 and 10 double strokes were carried out on the surfaces of the materials to be tested and gloss in gloss units was also tested.

Flowability (MVR) was determined as per DIN EN ISO 1133 at 240° C. under a 5 kg test load and at 220° C. under a 10 kg test load.

The haze (testing of optical and surface parameters of a plastic) of the ABS samples was evaluated by a panel of 10 independently of one another.

Evaluation is carried out via scores of 1 to 5 (wherein 5 is the highest score).

EXAMPLE 1 PRODUCTION AND TESTING OF THE MOLDING MATERIALS ACCORDING TO THE INVENTION a) Production of Component A1 of the Molding Material According to the Invention A styrene-acrylonitrile copolymer comprising 76 wt % of styrene and 24 wt % of acrylonitrile and having a viscosity number of 80 ml/g (determined as per DIN 53726 or DIN EN ISO 1628-2 in 0.5 wt % DMF solution at 25° C.) was produced by bulk polymerization (without solvent). The molecular weight (Mn) was about 100 000 g/mol (GPC in THF with PS calibration: stationary phase: 5-styrene-divinylbenzene gel columns (PLgel Mixed-B, Polymer Laboratories); THF 1.2 ml/min).

b) Production of Component A2 of the Molding Material According to the Invention An α-methylstyrene-acrylonitrile copolymer comprising 75 wt % of α-methylstyrene and 25 wt % of acrylonitrile and having a viscosity number of 80 ml/g (determined as per DIN 53726 or DIN EN ISO 1628-2 in 0.5 wt % DMF solution at 25° C.) was produced by bulk polymerization.

The molecular weight (Mn) was about 120 000 g/mol (GPC in THF with PS calibration: stationary phase: 5-styrene-divinylbenzene gel columns (PLgel Mixed-B, Polymer Laboratories); THF 1.2 ml/min).

c) Production of Component B1 of the Molding Material

A graft rubber comprising 60 wt % of polybutadiene as graft substrate and 40 wt % of a graft shell composed of 80 wt % styrene and 20 wt % acrylonitrile was produced by emulsion polymerization using potassium peroxodisulfate as initiator. The average particle size of was about 400 mm (measured using an ultracentrifuge).

d) Provision of Component D of the Molding Material

Irganox® PS802 (distearyl dithiopropionate), Ciba (Switzerland), was employed as component D.

e) Production of the Molding Materials According to the Invention

The components described in tables 1 and 2 for the inventive compositions (1 and 4) and the comparative compositions (V2 and V3) were intimately mixed in an extruder (Werner & Pfleiderer ZSK 30 twin-screw extruder) at a temperature of 240° C. The melt was then passed into a water bath and the product was pelletized.

The results of the testing of the obtained molding materials are reported in the following tables 1 and 2, wherein OP represents the oligomer proportion (in wt %) in the total composition.

TABLE 1

| molding material | 1 | V2 |
|---|---|---|
| A1 | 65 | 66 |
| B1 | 33 | 33 |
| D | 2 | 1 |
| OP | 2.2 | 3.5 |
| MVR [220/10] | 16.9 | 21.9 |
| Charpy (ak, 23° C.) [kJ/m$^2$] | 7.3 | 5.9 |
| Haze | 4 | 2 |

The molding material (1) comprising 2.2 wt % of oligomers achieves markedly better properties compared to comparative molding material (V2) comprising 3.5 wt %.

TABLE 2

| molding material | V3 | 4 |
|---|---|---|
| A2 | 99 | 99 |
| D | 1 | 1 |
| OP | <0.01 | 0.6 |
| MVR [220/10] | 8.3 | 9.1 |
| Charpy (ak, 23° C.) [kJ/m$^2$] | 1.3 | 1.2 |

Moreover, FIG. 1 (FIG. 1) reports the result of a Crockmeter test with gloss units (GU) before (0 double strokes, DS) and after scratching (5 and 10 double strokes) being shown on the left and gloss retention (%) after scratching (5 and 10 double strokes) being shown on the right.

It is apparent from FIG. 1 that gloss retention decreases markedly with an oligomer amount >3 wt % (2 corresponds to V2) compared to the molding material (1) having a lower oligomer proportion.

Figure 2:
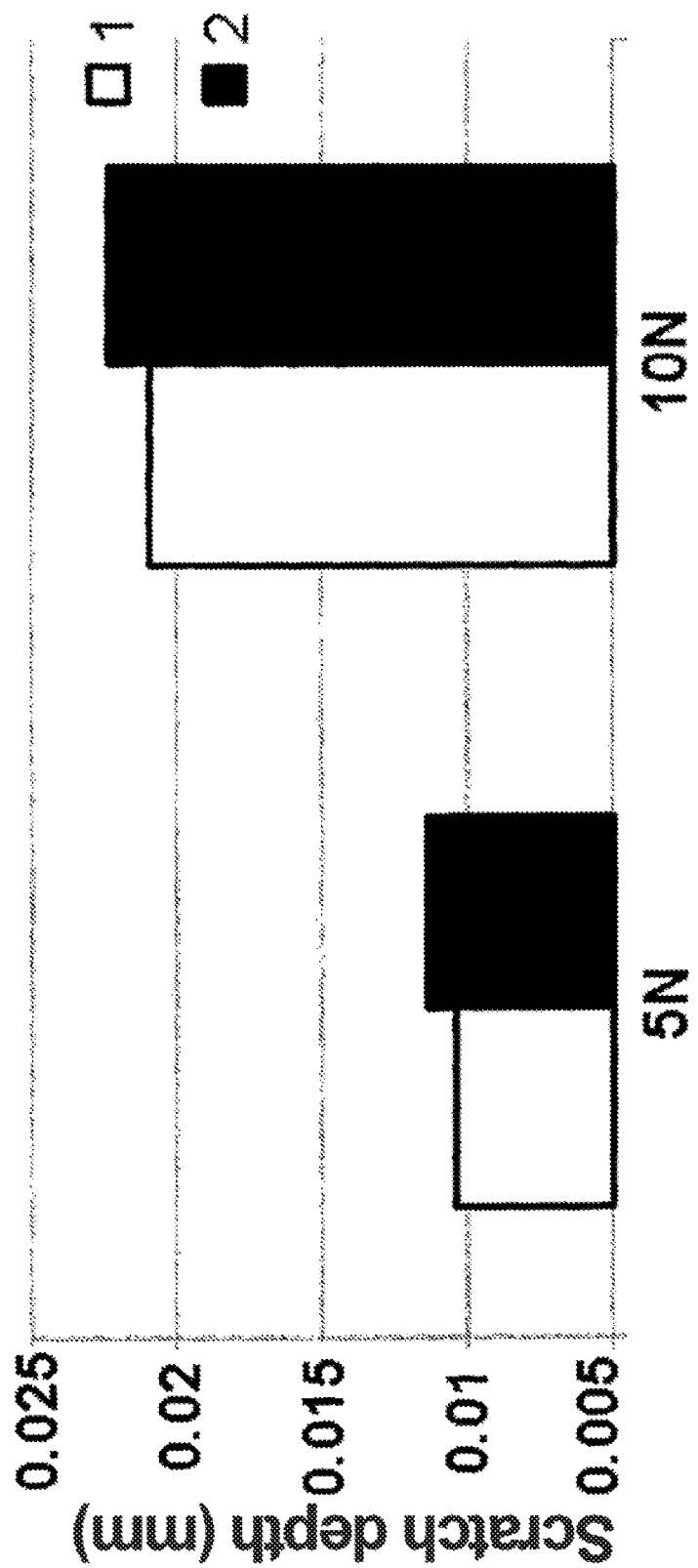
FIG. 2 reports the result of a nanoindentation test, scratch depth (in mm) reported for an applied force of 5 N and 10 N.

Moreover, FIG. 2 (FIG. 2) reports the result of a nanoindentation test, scratch depth (in mm) being reported for an applied force of 5 N and 10 N.

It is apparent also from the diagrams shown in FIG. 2 that the molding materials having an oligomer amount >3 wt % (2, corresponds to V2) exhibit deeper indentations after 5N/10N than the inventive composition (1).

The invention claimed is:

1. A thermoplastic composition comprising the components A and B and optionally the further components C and D which altogether sum to 100 wt %, wherein the molding material is composed of:
   a) 60 to 75 wt % of one or more styrene copolymers A,
   b) 25 to 40 wt % of one or more graft copolymers B,
   c) 0 to 15 wt % of a rubber C distinct from component B,
   d) 0 to 5 wt % of one or more additives D,
   wherein the composition comprises 1.1 to 2.8 wt % based on the total weight of the components A to D, of oligomers, wherein the oligomers have a weight average molar mass Mw in the range from 100 to 700 g/mol and are formed substantially from styrene and/or acrylonitrile, and wherein the oligomers are formed from 2, 3, 4, 5 or 6 monomer units,
   characterized in that the graft copolymer B is constructed from:
   (B1): 40 to 85 wt %, based on the solids content of the graft copolymer B, of a graft substrate B1 obtainable by:
   (a) polymerization of:
   (B11): 0 to 10 wt %, based on the graft substrate B1, of styrene, and (B12): 90 to 100 wt %, based on the graft substrate B1, of butadiene,
   and (b) agglomeration of the obtained graft substrate B1 by addition of:
   (E): 0.01 to 5 parts by wt, based on 100 parts by wt of the graft substrate B1, in each case based on the solids content, of an agglomerating copolymer (E) composed of:
   (E1): 80 to 99.9 wt % of one or more $C_1$- to $C_{12}$-alkyl acrylates or $C_1$- to $C_{12}$-alkyl methacrylates and
   (E2): 0.1 to 20 wt % of one or more comonomers selected from the group consisting of acrylamide, methylacrylamide, ethylacrylamide and n-butylacrylamide; and
   (B2): 15 to 60 wt %, based on the solids content of the graft copolymer B, of a graft shell (B2), obtainable by reaction of the agglomerated graft substrate B1 with a mixture of:
   (B21): 70 to 90 wt %, based on the graft shell B2, of styrene, and
   (B22): 10 to 30 wt %, based on the graft shell B2, of acrylonitrile,
   wherein
   (i) the agglomerating copolymer (E) has a polydispersity U of less than 0.27 and a $d_{50}$ value of 100 to 150 nm and
   (ii) the agglomerated graft substrate B1 has a bimodal particle size distribution of a fraction x) of nonagglomerated particles having a $d_{50}$ value in the range from 80 to 120 nm and a fraction y) of agglomerated particles having a $d_{50}$ value in the range from 350 to 550 nm and a polydispersity U of less than 0.27.

2. The composition as claimed in claim 1, characterized in that component B is a polybutadiene rubber produced using 1 to 5 wt %, based on component B, of an agglomerating added substance.

3. The composition as claimed in claim 1, characterized in that said composition comprises 60 to 70 wt % of one or more styrene copolymers A, wherein this styrene copolymer A is constructed from two or more monomers from the groups styrene, α-methylstyrene on the one hand and acrylonitrile and/or methyl methacrylate on the other hand.

4. The composition as claimed in claim 1, characterized in that said composition comprises 29 to 37 wt % of one or more graft copolymers B, wherein this graft copolymer B is constructed from a graft substrate and at least one graft superstrate, wherein the graft superstrate is constructed from two or more monomers from the group butadiene, styrene, acrylonitrile, α-methylstyrene, MMA, butyl acrylate, ethyl acrylate and methylacrylamide.

5. The composition as claimed in claim 1, characterized in that said composition additionally comprises 1 to 15 wt % of a rubber C distinct from component B, wherein said further rubber C comprises two or more monomers from the group ethene, propene, butene and/or octene as building blocks.

6. The composition as claimed in claim 1, characterized in that the component A is constructed from 60 to 85 wt % of styrene and 15 to 40 wt % of acrylonitrile.

7. The composition as claimed in claim 1, comprising the components A and B and D which altogether sum to 100 wt %, wherein the molding material is composed of 65 to 70 wt % of a styrene-acrylonitrile copolymer A, 30 to 35 wt % of an ABS graft copolymer B and 0.1 to 5 wt % of an additive D, wherein the composition comprises 1.1 to 2.8 wt %, based on the total weight of the components A to D, of an oligomer composed of styrene and/or acrylonitrile having a weight average molar mass Mw of 100 to 700 g/mol.

8. A method of producing a thermoplastic composition as claimed in claim 1 by mixing the components A and B and optionally the further components C and/or D.

9. A method of producing a thermoplastic composition as claimed in claim 1 by the following steps:
(i) polymerizing styrene, α-methylstyrene and/or acrylonitrile, wherein the thus obtained composition comprises 1.1 to 2.8 wt %, based on the total weight of the components A to D, of oligomers, wherein the oligomers have a weight average molar mass Mw in the range from 100 to 700 g/mol and are formed substantially from styrene and/or acrylonitrile and wherein the oligomers are formed from 2, 3, 4, 5 or 6 monomer units,
(ii) polymerizing the monomers styrene and butadiene in aqueous emulsion to afford a particulate graft substrate B1,
(iii) agglomeration of the particulate graft substrate B1 which is present in an emulsion using an agglomerating copolymer (E), wherein the copolymer (E) has a polydispersity U of less than 0.27 and a $d_{50}$ value of 100 to 150 nm to afford an agglomerated particulate graft substrate B1 and subsequently
(iv) polymerizing the monomers styrene and acrylonitrile of the graft shell in aqueous emulsion in the presence of the agglomerated particulate graft substrate 131,
(v) mixing the components A and B and optionally the further components C and/or D.

10. The method of producing a thermoplastic composition as claimed in claim 9, wherein the mixing of the components is effected in an extruder and the extruding procedure is effected over a time period of 0.2 to 30 minutes and in a temperature range from 230° C. to 260° C.

11. A thermoplastic composition as claimed in claim 1 in the form of a fiber, a film or a molded article.

12. A molded article, fiber or film made of a thermoplastic composition according to claim 1.

13. A thermoplastic composition comprising the components A and B and optionally the further components C and D which altogether sum to 100 wt %, wherein the molding material is composed of:
a) 60 to 75 wt % of one or more styrene copolymers A,
b) 25 to 40 wt % of one or more graft copolymers B,
c) 1 to 15 wt % of a rubber C distinct from component B,
d) 0 to 5 wt % of one or more additives D,
wherein the composition comprises 1.1 to 2.8 wt % based on the total weight of the components A to D, of oligomers, wherein the oligomers have a weight average molar mass Mw in the range from 100 to 700 g/mol and are formed substantially from styrene and/or acrylonitrile, wherein the oligomers are formed from 2, 3, 4, 5 or 6 monomer units, and wherein said further rubber C comprises two or more monomers from the group ethene, propene, butene and/or octene as building blocks.

14. The composition as claimed in claim 13, characterized in that component B is a polybutadiene rubber produced using 1 to 5 wt %, based on component B, of an agglomerating added substance.

15. A method of producing a thermoplastic composition as claimed in claim 13 by mixing the components A and B and optionally the further components C and/or D.

16. A method of producing a thermoplastic composition as claimed in claim 13 by the following steps:
(i) polymerizing styrene, α-methylstyrene and/or acrylonitrile, wherein the thus obtained composition comprises 1.1 to 2.8 wt %, based on the total weight of the components A to D, of oligomers, wherein the oligomers have a weight average molar mass Mw in the range from 100 to 700 g/mol and are formed substantially from styrene and/or acrylonitrile and wherein the oligomers are formed from 2, 3, 4, 5 or 6 monomer units,
(ii) polymerizing the monomers styrene and butadiene in aqueous emulsion to afford a particulate graft substrate B1,
(iii) agglomeration of the particulate graft substrate B1 which is present in an emulsion using an agglomerating copolymer (E), wherein the copolymer (E) has a polydispersity U of less than 0.27 and a $d_{50}$ value of 100 to 150 nm to afford an agglomerated particulate graft substrate B1 and subsequently
(iv) polymerizing the monomers styrene and acrylonitrile of the graft shell in aqueous emulsion in the presence of the agglomerated particulate graft substrate B1,
(v) mixing the components A and B and optionally the further components C and/or D.

17. The method of producing a thermoplastic composition as claimed in claim 16, wherein the mixing of the components is effected in an extruder and the extruding procedure is effected over a time period of 0.2 to 30 minutes and in a temperature range from 230° C. to 260° C.

18. A thermoplastic composition as claimed in claim 13 in the form of a fiber, a film or a molded article.

19. A molded article, fiber or film made of a thermoplastic composition according to claim 13.

20. A method of producing a thermoplastic composition comprising the components A and B and optionally the further components C and D which altogether sum to 100 wt %, wherein the molding material is composed of:
a) 60 to 75 wt % of one or more styrene copolymers A, b) 25 to 40 wt % of one or more graft copolymers B,
c) 0 to 15 wt % of a rubber C distinct from component B,
d) 0 to 5 wt % of one or more additives D,
wherein the composition comprises 1.1 to 2.8 wt % based on the total weight of the components A to D, of oligomers, wherein the oligomers have a weight average molar mass Mw in the range from 100 to 700 g/mol and are formed substantially from styrene and/or acrylonitrile, and wherein the oligomers are formed from 2, 3, 4, 5 or 6 monomer units;
by the following steps:
(i) polymerizing styrene, α-methylstyrene and/or acrylonitrile, wherein the thus obtained composition comprises 1.1 to 2.8 wt %, based on the total weight of the components A to D, of oligomers, wherein the oligomers have a weight average molar mass Mw in the range from 100 to 700 g/mol and are formed substantially from styrene and/or acrylonitrile and wherein the oligomers are formed from 2, 3, 4, 5 or 6 monomer units,
(ii) polymerizing the monomers styrene and butadiene in aqueous emulsion to afford a particulate graft substrate B1,
(iii) agglomeration of the particulate graft substrate B1 which is present in an emulsion using an agglomerating copolymer (E), wherein the copolymer (E) has a polydispersity U of less than 0.27 and a $d_{50}$ value of 100 to 150 nm to afford an agglomerated particulate graft substrate B1 and subsequently
(iv) polymerizing the monomers styrene and acrylonitrile of the graft shell in aqueous emulsion in the presence of the agglomerated particulate graft substrate B1,
(v) mixing the components A and B and optionally the further components C and/or D;
wherein the mixing of the components is effected in an extruder and the extruding procedure is effected over a time period of 0.2 to 30 minutes and in a temperature range from 230° C. to 260° C.

* * * * *